(12) United States Patent
Li et al.

(10) Patent No.: US 11,660,663 B2
(45) Date of Patent: May 30, 2023

(54) SPIRAL-ORIFICE CERAMIC FILTER FOR METAL CASTING

(71) Applicant: Wuhan University of Science and Technology, Wuhan (CN)

(72) Inventors: Guangqiang Li, Wuhan (CN); Qiang Wang, Wuhan (CN); Yu Liu, Wuhan (CN); Ao Huang, Wuhan (CN); Wen Yan, Wuhan (CN); Wan Zheng, Wuhan (CN); Huazhi Gu, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 416 days.

(21) Appl. No.: 16/989,541

(22) Filed: Aug. 10, 2020

(65) Prior Publication Data

US 2021/0121944 A1    Apr. 29, 2021

(30) Foreign Application Priority Data

Oct. 25, 2019 (CN) .......................... 201911024031.X

(51) Int. Cl.
*B22C 9/08* (2006.01)
*C04B 35/04* (2006.01)
(Continued)

(52) U.S. Cl.
CPC .............. *B22C 9/086* (2013.01); *C04B 35/04* (2013.01); *C04B 38/0051* (2013.01);
(Continued)

(58) Field of Classification Search
CPC ..... B22C 9/026; C04B 35/04; C04B 38/0051; C04B 41/009; C04B 41/5032;
(Continued)

(56) References Cited

U.S. PATENT DOCUMENTS

2016/0186290 A1 *  6/2016  Hitchings ................. C21B 3/04
                                                         266/227

FOREIGN PATENT DOCUMENTS

DE            19756687 C1 *  6/1999  ............. B22C 9/086

\* cited by examiner

*Primary Examiner* — Scott R Kastler
(74) *Attorney, Agent, or Firm* — Jordan IP Law, LLC; Todd A. Vaughn

(57) ABSTRACT

A spiral-orifice ceramic filter for metal casting, including spiral channels and two drain openings, where the spiral channels are distributed in a ceramic substrate in a staggered manner. By adoption of the spiral channel structure, molten metal may rotate to generate a centrifugal force while flowing forwards so as to promote separation of inclusions. The spiral-orifice ceramic filter for metal casting includes the following components: 90-95 wt % of MgO, 4-8 wt % of $SiO_2$ and 2-4 wt % of $ZrO_2$. Therefore, the spiral-orifice ceramic filter for metal casting has high strength under normal temperature and optional thermal impact resistance under high temperature, and may tolerate the impact of molten metal at 1700° C. or higher without break. The ceramic substrate and the spiral channel are superficially coated with one layer of functional oxide prepared from $CaO.2Al_2O_3$, $CaO.6Al_2O_3$, $Al_2O_3$, $TiO_2$, or $Re_2O_3$.

8 Claims, 3 Drawing Sheets

(51) Int. Cl.
*C04B 38/00* (2006.01)
*C04B 41/00* (2006.01)
*C04B 41/50* (2006.01)
*C04B 41/87* (2006.01)

(52) U.S. Cl.
CPC ........ *C04B 41/009* (2013.01); *C04B 41/5032* (2013.01); *C04B 41/5041* (2013.01); *C04B 41/87* (2013.01); *C04B 2235/3206* (2013.01); *C04B 2235/3244* (2013.01); *C04B 2235/3418* (2013.01); *C04B 2235/9676* (2013.01)

(58) Field of Classification Search
CPC ................ C04B 41/5041; C04B 41/87; C04B 2235/3206; C04B 2235/3244; C04B 2235/3418; C04B 2235/9676
See application file for complete search history.

SPIRAL-ORIFICE CERAMIC FILTER FOR METAL CASTING

CROSS REFERENCE TO RELATED APPLICATIONS

The present application claims priority to Chinese Patent Application No. 201911024031.X (filed on Oct. 25, 2019), the entire content of which is incorporated herein by reference in its complete entirety.

TECHNICAL FIELD

The invention relates to a spiral-orifice ceramic filter for metal casting and belongs to the technical field of metal casting.

BACKGROUND

The cleanliness of molten metal has important impact on improvement of mechanical properties of metal castings. With the increasing demands on the properties of castings and subsequent processed products, removing non-metallic inclusions in the molten metal by various means has become a hotspot for metallurgical workers.

Due to the advantages of simple structure, high removal efficiency and convenience in use, the ceramic filter has become a molten metal purification and filtration device widely used at present. It can be divided into a foam ceramic filter and a porous ceramic filter. The foam ceramic filter is generally prepared from silicon carbide, aluminum oxide, zirconium oxide, aluminum oxide-carbon, and the like. The foam-like honeycomb ceramic filter has good filtering effect, but has low high-temperature strength and low impact resistance, cannot resist long-time impact of molten metal at high temperature, also has the disadvantages that metal is carburized and the like and is not suitable for filtration and purification of a large amount of high-temperature molten metal, thereby limiting wide application in the field of metal casting.

The other one is the porous ceramic filter newly developed in recent years. This filter has the advantages of thick skeleton, flat appearance, high heat strength, high impact resistance and low production cost. Currently, the porous ceramic filters are all characterized by having round straight-through orifices in the ceramic substrate. When molten metal flows through the straight-through orifice, due to the change of the flow streamline, the inclusions deviate from the original motion trajectory to move towards the wall surface of the ceramic substrate so as to be adsorbed by the ceramic substrate and be finally separated from the molten metal. However, due to the simple orifice structure, the ability to change the motion trajectory of the inclusions is limited and the removal rate of the inclusions is not high.

SUMMARY

An objective of the present invention is to overcome the shortcomings of the prior art and provide a spiral-orifice ceramic filter for metal casting, which has a simple structure, low cost, and high removal rate of inclusions, and can resist thermal impact under high temperature.

To achieve the above objective, the technical solution is as follows: a spiral-orifice ceramic filter for metal casting includes a filter channel, where two drain openings are formed at the bottom of the ceramic filter, the filter channel is spiral, upper and lower rows of spiral channels are distributed in a ceramic substrate in a staggered manner, a vertical section of each spiral channel is round, and the ceramic substrate and the spiral channel are superficially coated with one layer of functional oxide prepared from $CaO \cdot 2Al_2O_3$, $CaO \cdot 6Al_2O_3$, $Al_2O_3$, $TiO_2$, or $Re_2O_3$.

A diameter of the spiral channel is ¼ to ⅓ a thickness of the ceramic filter.

A horizontal distance between two spiral channels is 2 to 3 times a diameter of a spiral line.

A vertical distance between the upper and lower rows of the spiral channels is 2.5 to 3.5 times the diameter of the spiral line.

The spiral line has no more than three spiral coils.

The diameter of the spiral line is 1.5 to 2.5 times that of the channel.

A thickness of the filter is in a range of 60-120 mm according to the external dimensions of the filter.

A substrate of the spiral-orifice ceramic filter for metal casting is shaped like a flat plate.

The spiral-orifice ceramic filter for metal casting includes the following components: 90-95 wt % of MgO, 4-8 wt % of $SiO_2$ and 2-4 wt % of $ZrO_2$.

It can be known from the above technical solution, the spiral-orifice ceramic filter for metal casting according to the present invention includes a spiral channel and two drain openings, where the spiral channels are distributed in a ceramic substrate in a staggered manner, a spiral line has no more than three spiral coils, and the spiral-orifice ceramic filter for metal casting has a simple structure, can be easily formed and sintered, and conveniently transported and mounted, and is suitable for an existing preparation process for a refractory material; furthermore, by adoption of the spiral channel structure, molten metal may rotate to generate a centrifugal force while flowing forwards so as to promote separation of inclusions; since the spiral-orifice ceramic filter for metal casting includes the following components: 90-95 wt % of MgO, 4-8 wt % of $SiO_2$ and 2-4 wt % of $ZrO_2$, the filter has high strength under normal temperature and optimal thermal impact resistance under high temperature, and may tolerate the impact of molten metal at 1700° C. or higher without break; and the ceramic substrate and the spiral channel are superficially coated with one layer of functional oxide prepared from $CaO \cdot 2Al_2O_3$, $CaO \cdot 6Al_2O_3$, $Al_2O_3$, $TiO_2$, or $Re_2O_3$, thereby improving the adsorption efficiency on the inclusions.

To sum up, the technical solution of the present invention has the following beneficial effects:

(1) the spiral-orifice ceramic filter for metal casting according to the present invention has a simple structure, can be easily formed and sintered, and conveniently transported and mounted, and is suitable for an existing preparation process for a refractory material;

(2) the spiral-orifice ceramic filter for metal casting has high strength under normal temperature and optimal thermal impact resistance under high temperature, and may tolerate the impact of molten metal at 1700° C. or higher without break;

(3) by adoption of the spiral channel structure, molten metal may rotate to generate a centrifugal force while flowing forwards so as to promote separation of inclusions; and (4) the functional oxide coating may improve the adsorption efficiency of the ceramic substrate on the inclusions.

Figure 1:
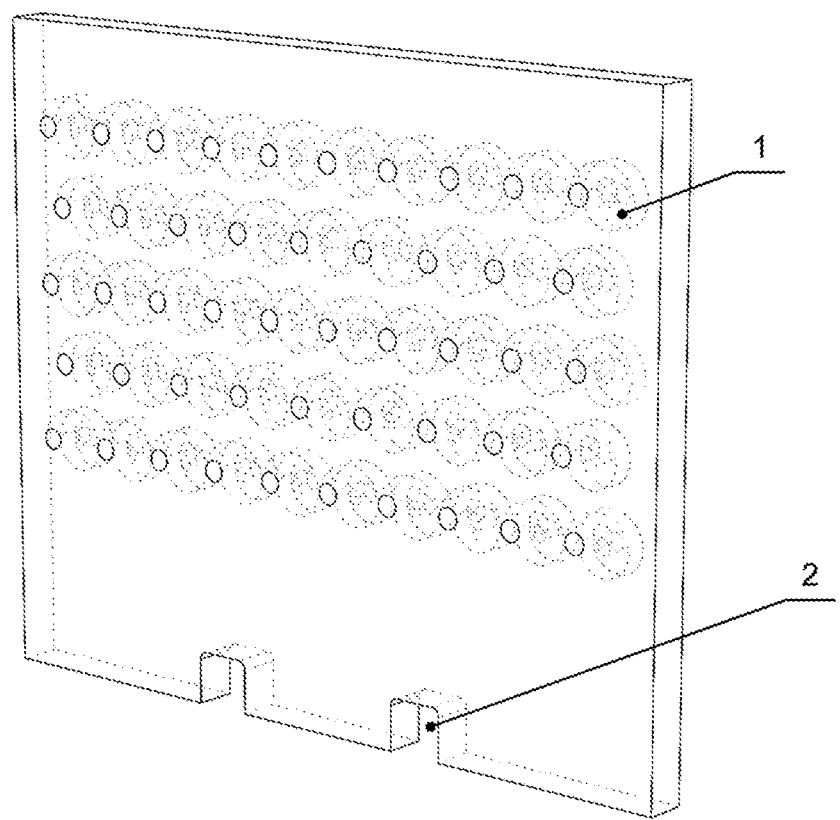
FIG. 1 is a schematic structural diagram of a spiral-orifice ceramic filter for metal casting according to the present invention.

In the figures, reference numeral 1 is a spiral channel, reference numeral 2 is a drain opening; reference symbol a is a diameter of a round channel, reference symbol b is a gap between two spiral lines, reference symbol c is a diameter of the spiral line, reference symbol d is a horizontal distance between two spiral channels, and reference symbol e is a vertical distance between upper and lower rows of spiral channels.

DETAILED DESCRIPTION

The present invention will be further described with reference to the accompanying drawings and the examples.

Figure 2:
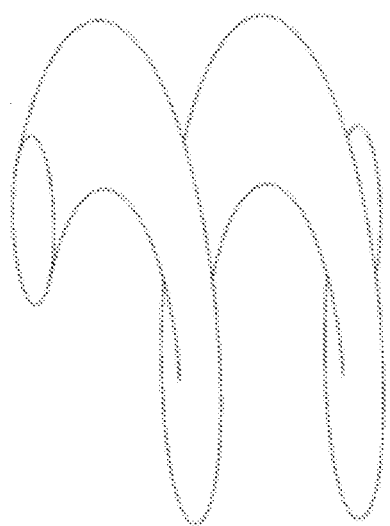
FIG. 2 is a schematic diagram of a spiral channel.

As shown in FIG. 1, a structure of the spiral-orifice ceramic filter for metal casting according to the present invention includes a spiral channel 1 and a drain opening 2. A schematic diagram of the spiral channel is shown in FIG. 2.

Example 1

The spiral-orifice ceramic filter according to the example has chemical components including 92 wt % of MgO, 5 wt % of $SiO_2$ and 3 wt % of $ZrO_2$, and a thickness of 80 mm.

Figure 3:
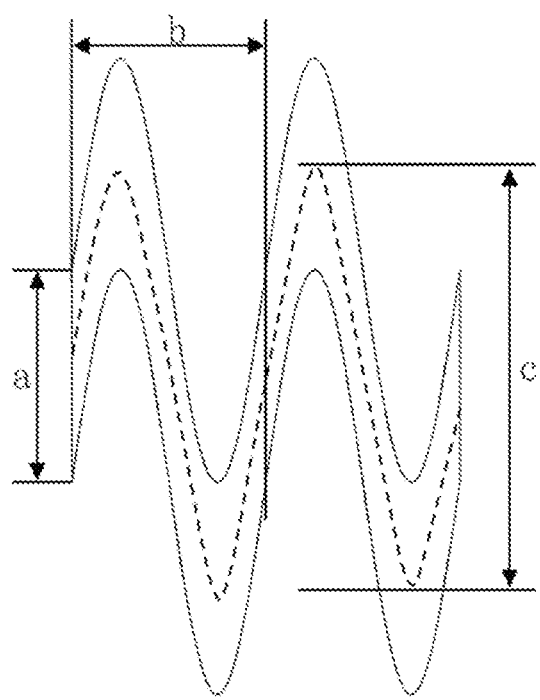
FIG. 3 is a side view of a spiral channel.

A structure of the spiral channel is shown in FIG. 3, a diameter a of a round channel is 25 mm, there are two spiral coils, a gap b between two spiral lines is 40 mm, and a diameter c of the spiral line is 37.5 mm.

Figure 4:
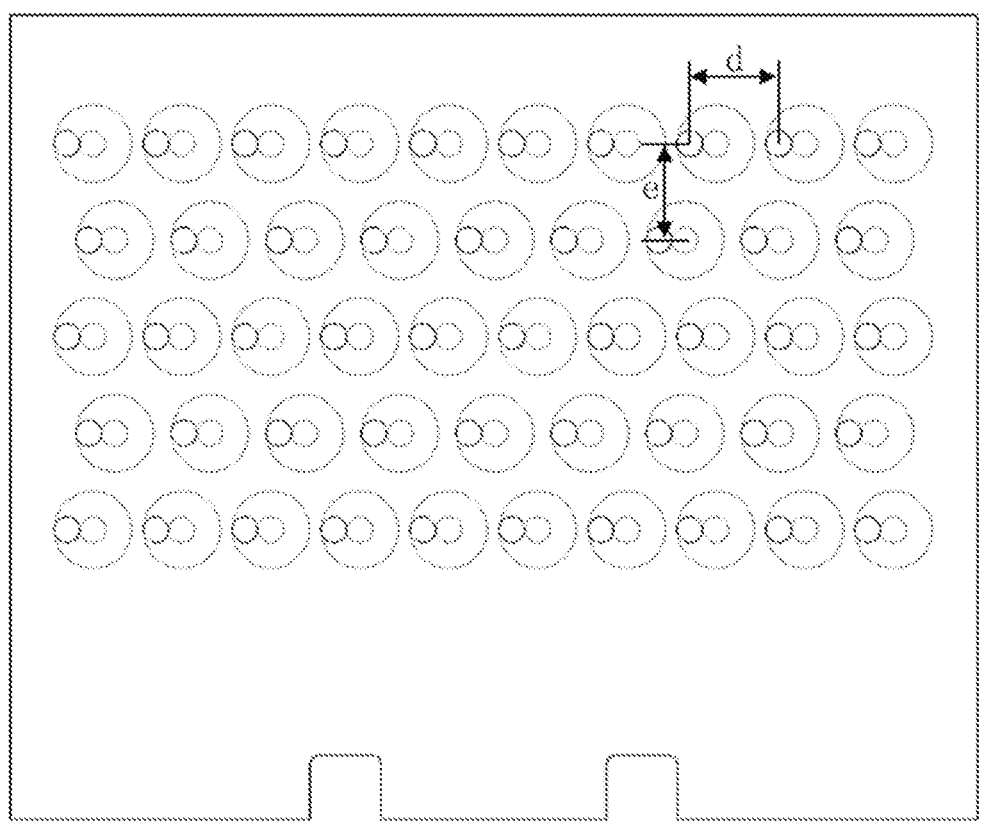
FIG. 4 is a front view of a spiral-orifice ceramic filter.

Distribution of the spiral channels on the ceramic substrate is shown in FIG. 4, a horizontal distance d between two spiral channels is 75 mm, a vertical distance e between upper and lower rows of spiral channels is 95 mm, and the upper and lower rows of spiral channels are distributed in a staggered manner.

The ceramic substrate and the spiral channel of the spiral-orifice ceramic filter for metal casting are superficially coated with one layer of $CaO.2Al_2O_3$.

The spiral-orifice ceramic filter for metal casting is not damaged after being subjected to a filter test of 1000 kg of carbon steel liquid at high temperature of 1550° C. by a 500 mm casting pressure head. Through analysis of components and a microstructure of a steel ingot before and after casting, the content of the inclusions is reduced by about 65%.

Example 2

The spiral-orifice ceramic filter according to the example has chemical components including 90 wt % of MgO, 6 wt % of $SiO_2$ and 4 wt % of $ZrO_2$, and a thickness of 100 mm.

According to the spiral-orifice ceramic filter, a diameter a of a round channel is 30 mm, there are two spiral coils, a gap b between two spiral lines is 50 mm, and a diameter c of the spiral line is 45 mm.

A horizontal distance d between two spiral channels is 90 mm, a vertical distance e between upper and lower rows of spiral channels is 115 mm, and the upper and lower rows of spiral channels are distributed in a staggered manner.

The ceramic substrate and the spiral channel of the spiral-orifice ceramic filter for metal casting are superficially coated with one layer of $TiO_2$.

The spiral-orifice ceramic filter for metal casting is not damaged after being subjected to a filter test of 500 kg of molten aluminum at high temperature of 950° C. by a 500 mm casting pressure head. Through analysis of components and a microstructure of an aluminum ingot before and after casting, the content of the inclusions is reduced by about 70%.

What is claimed is:

1. A spiral-orifice ceramic filter for metal casting, comprising:
   a ceramic filter substrate that includes spiral filter channels arranged in rows such that adjacent rows are distributed in a staggered manner, each spiral filter channel having a vertical section that is round, and wherein two drain openings are formed at a bottom of the ceramic filter substrate,
   wherein the ceramic filter substrate and the spiral filter channels are coated with an oxide layer with a composition of one of $CaO.2Al_2O_3$, $CaO.6Al_2O_3$, $Al_2O_3$, $TiO_2$, or $Re_2O_3$, and wherein the spiral-orifice ceramic filter comprises 90-95 wt % of MgO, 4-8 wt % of $SiO_2$, and 2-4 wt % of $ZrO_2$.

2. The spiral-orifice ceramic filter of claim 1, wherein a diameter of each spiral filter channel is ¼ to ⅓ a thickness of the ceramic filter.

3. The spiral-orifice ceramic filter of claim 1, wherein in each row, a horizontal distance between adjacent spiral channels is 2 to 3 times a diameter of a spiral line that forms each respective spiral channel.

4. The spiral-orifice ceramic filter of claim 1, wherein a vertical distance between the adjacent rows of the spiral filter channels is 2.5 to 3.5 times a diameter of a spiral line that forms each respective spiral filter channel.

5. The spiral-orifice ceramic filter of claim 1, wherein spiral line that forms each respective spiral filter channel has no more than three spiral coils.

6. The spiral-orifice ceramic filter of claim 1, wherein a diameter of a spiral line that forms each respective spiral filter channel is 1.5 to 2.5 times that of the spiral filter channel.

7. The spiral-orifice ceramic filter of claim 1, wherein a thickness of each spiral filter channel is in a range of 60-120 mm according to external dimensions of the spiral filter channel.

8. The spiral-orifice ceramic filter of claim 1, wherein the ceramic filter substrate is shaped like a flat plate.

* * * * *